US011349386B2

(12) United States Patent
Yeo et al.

(10) Patent No.: US 11,349,386 B2
(45) Date of Patent: May 31, 2022

(54) APPARATUS AND METHOD FOR CHARGING BATTERY OF VEHICLE

(71) Applicants: HYUNDAI MOTOR COMPANY, Seoul (KR); KIA MOTORS CORPORATION, Seoul (KR)

(72) Inventors: Inyong Yeo, Bucheon-si (KR); Minseong Choi, Daejeon (KR); Sihun Yang, Hwaseong-si (KR); Jin Young Yang, Hanam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 20 days.

(21) Appl. No.: 17/091,809

(22) Filed: Nov. 6, 2020

(65) Prior Publication Data
US 2021/0399628 A1 Dec. 23, 2021

(30) Foreign Application Priority Data
Jun. 17, 2020 (KR) .................. 10-2020-0073830

(51) Int. Cl.
*H02M 1/42* (2007.01)
*H02M 7/527* (2006.01)
*H02M 3/335* (2006.01)
*B60L 53/14* (2019.01)
*H02J 7/02* (2016.01)

(52) U.S. Cl.
CPC ........... *H02M 1/4208* (2013.01); *B60L 53/14* (2019.02); *H02J 7/02* (2013.01); *H02M 3/33584* (2013.01); *H02M 7/527* (2013.01); *B60L 2210/10* (2013.01)

(58) Field of Classification Search
CPC .............. H02M 1/4208; H02M 7/527; H02M 3/33854; B60L 2210/10; B60L 53/14; H02J 7/02
USPC ....................................................... 320/109
See application file for complete search history.

(56) References Cited

U.S. PATENT DOCUMENTS

| 5,581,171 A * | 12/1996 | Kerfoot et al. ......... B60L 53/20 320/137 |
| 7,400,116 B2 * | 7/2008 | Kato et al. .............. H02P 27/08 320/166 |
| 7,830,036 B2 * | 11/2010 | Wei et al. ........... H02M 5/4585 307/31 |
| 8,154,895 B2 * | 4/2012 | Gilmore .............. H02M 7/1626 363/129 |

(Continued)

*Primary Examiner* — Sun J Lin
(74) *Attorney, Agent, or Firm* — McDonnell Boehnen Hulbert & Berghoff LLP

(57) ABSTRACT

An apparatus, for charging a battery for a vehicle, includes a PFC circuit comprising a rectifier for rectifying an AC power to a DC power, and a link capacitor for smoothing the rectified DC power, a bidirectional DC-DC converter including a first switch for converting the DC power of the PFC circuit to an AC power, a transformer for boosting or reducing a voltage of the AC power converted at the first switch, and a second switch for rectifying an AC power from the transformer to a DC power, and a controller configured to control a phase of a PWM signal applied to the second switch such that the link capacitor is charged by an electrical power from the battery, when a voltage of the link capacitor is below a predetermined voltage prior to entering a battery charging mode.

10 Claims, 12 Drawing Sheets

(56) References Cited

U.S. PATENT DOCUMENTS

| | | | |
|---|---|---|---|
| 8,612,073 B2* | 12/2013 | Fuji et al. | H02H 9/001 |
| | | | 701/22 |
| 10,351,004 B1 | 7/2019 | Pastor et al. | |
| 2009/0244944 A1* | 10/2009 | Jang | H02M 3/33576 |
| | | | 363/126 |
| 2012/0280655 A1* | 11/2012 | Schneider | B60L 53/53 |
| | | | 320/109 |
| 2014/0244082 A1* | 8/2014 | Caron | B60L 50/61 |
| | | | 701/22 |
| 2018/0079315 A1* | 3/2018 | Yang et al. | H02M 7/46 |
| 2018/0205340 A1* | 7/2018 | Chen et al. | H02P 29/50 |
| 2018/0219473 A1* | 8/2018 | Ogino | G05F 1/575 |

* cited by examiner

APPARATUS AND METHOD FOR CHARGING BATTERY OF VEHICLE

CROSS-REFERENCE TO RELATED APPLICATION

The present application claims priority to and the benefit of Korean Patent Application No. 10-2020-0073830 filed on Jun. 17, 2020, the entire contents of which are incorporated herein by reference.

TECHNICAL FIELD

The present disclosure relates to an apparatus and method for charging a battery of a vehicle.

BACKGROUND

Recently, due to global warming due to environmental pollution and depletion of fossil fuels, the vehicle industry is rapidly developing electric vehicles. Major vehicle manufacturers around the world are currently researching and developing to make electric vehicles as major vehicles.

The electric vehicle (EV) may be driven by accumulating electrical energy in a battery, which is a rechargeable battery and by converting the accumulated electrical energy into power energy using a motor. At this time, a method for accumulating the electrical energy in a battery may be classified into a fast charging scheme in which a high voltage DC power (e.g., about 50 KW or more) is directly applied to the battery, and a slow charging scheme in which AC power having a commercial alternating current (AC) voltage (e.g., about 3-6 KW) is applied to the battery.

With regard to the slow charging scheme, an on-board charger (OBC) has a possibility of damage to elements due to the presence of an inrush current (IR), and a pre-charge relay is typically disposed to an input terminal to prevent such a possibility. That is, by switching the pre-charge relay to firstly charge a link capacitor by an external power source prior to charging the battery by driving a DC-DC converter, the occurrence of the inrush current (IR) is reduced when the on-board charger (OBC) is connected to the external power source.

Meanwhile, there is a drawback that the pre-charge relay for initial charging of the link capacitor has a large size, a design for securing durability is required, and particularly, three or more pre-charge relays are required in the case of a 3-phase input. In addition, the conventional pre-charge relay has a possibility of durability deterioration due to continuous on/off operation.

Accordingly, a new scheme for charging the link capacitor while solving the problem of the pre-charge relay is required.

The above information disclosed in this Background section is only for enhancement of understanding of the background of the disclosure, and therefore it may contain information that does not form the prior art that is already known in this country to a person of ordinary skill in the art.

SUMMARY

An exemplary apparatus for charging a battery for a vehicle, includes a PFC circuit part including a rectifier part for rectifying an AC power applied from a commercial AC power source to a DC power in a battery charging mode for charging the battery for a vehicle, and a link capacitor connected in parallel to the rectifier part to smooth the rectified DC power, a bidirectional DC-DC converter including a first switching part configured to convert a DC power applied from the PFC circuit part to an AC power, a transformer configured to boost or reduce a voltage of the AC power converted at the first switching part, and a second switching part configured to rectify an AC power applied from the transformer to a DC power to charge the battery for a vehicle, and a controller configured to control a phase of a PWM signal applied to the second switching part such that the link capacitor is charged by an electrical power discharged from the battery for a vehicle, when a voltage of the link capacitor is below a predetermined reference voltage prior to entering the battery charging mode.

The second switching part may include a first MOSFET and a second MOSFET connected in series between a first electrode and a second electrode of the battery for a vehicle, and a third MOSFET and a fourth MOSFET connected in series between a first terminal of the first MOSFET and a second terminal of the second MOSFET. A first terminal of a primary coil of the transformer may be connected to a first node between the first MOSFET and the second MOSFET, and a second terminal of the primary coil may be connected to a second node between the third MOSFET and the fourth MOSFET.

The controller may be configured to calculate a level of a charging current to be applied to the link capacitor in order to charge the link capacitor above or equal to the reference voltage, and to shift phases of a third PWM signal and a fourth PWM signal for controlling switching of the third MOSFET and the fourth MOSFET such that a voltage corresponding to the calculated charging current is applied to the transformer.

The controller may be configured to calculate an increment of the charging current per unit time, and to shift phases of the third PWM signal and the fourth PWM signal such that a voltage corresponding to the increment of the calculated charging current is applied to the transformer.

When the voltage of the link capacitor is charged above the reference voltage, the controller may control the first to fourth PWM signals such that, when the first MOSFET and the third MOSFET are turned on, the second MOSFET and the fourth MOSFET are turn off, and when the first MOSFET and the third MOSFET are turned off, the second MOSFET and the fourth MOSFET are turned on. The electrical power applied from the commercial AC power source may be applied to the battery for a vehicle through a charging path including the PFC circuit part, the first switching part, the transformer, and body diodes of the first to fourth MOSFETs.

An exemplary method for charging a battery for a vehicle utilizes a bidirectional DC-DC converter including a first switching part connected to an output terminal of a PFC circuit part for rectifying an AC power of a commercial AC power source to a DC power and configured to convert the DC power to an AC power, a transformer configured to boost or reduce a voltage of the AC power converted at the first switching part, and a second switching part configured to rectify an AC power applied from the transformer to a DC power to charge the battery for a vehicle. The exemplary method includes sensing a voltage of a link capacitor connected in parallel to an output terminal of the PFC circuit part, synchronously to a time point of entering a charging mode for charging the battery for a vehicle, determining whether the sensed voltage of the link capacitor is below a predetermined reference voltage, charging the link capacitor by an electrical power discharged from the battery for a vehicle, by controlling a phase of a PWM signal applied to the second switching part, when the sensed voltage of the link capacitor is below the predetermined reference voltage, and charging the battery for a vehicle by an electrical power applied from the commercial AC power source when the voltage of the link capacitor is charged above the reference voltage.

The second switching part may include a first MOSFET and a second MOSFET connected in series between a first electrode and a second electrode of the battery for a vehicle, and a third MOSFET and a fourth MOSFET connected in series between a first terminal of the first MOSFET and a second terminal of the second MOSFET. A first terminal of a primary coil of the transformer may be connected to a first node between the first MOSFET and the second MOSFET, and a second terminal of the primary coil may be connected to a second node between the third MOSFET and the fourth MOSFET.

The charging of the link capacitor may include calculating a level of a charging current to be applied to the link capacitor in order charge the link capacitor above or equal to the reference voltage, and shifting phases of a third PWM signal and a fourth PWM signal for controlling switching of the third MOSFET and the fourth MOSFET such that such that a voltage corresponding to the calculated charging current is applied to the transformer, so as to charge the link capacitor.

In the calculating of the level of the charging current, an increment of the charging current per unit time may be calculated. In the charging of the link capacitor, phases of the third PWM signal and the fourth PWM signal may be shifted such that a voltage corresponding to the increment of the calculated charging current is applied to the transformer, so as to charge the link capacitor.

In the charging of the battery for a vehicle, when the voltage of the link capacitor is charged above the reference voltage, the first to fourth PWM signals may be controlled such that, when the first MOSFET and the third MOSFET are turned on, the second MOSFET and the fourth MOSFET are turn off, and when the first MOSFET and the third MOSFET are turned off, the second MOSFET and the fourth MOSFET are turned on, and The electrical power applied from the commercial AC power source may be applied to the battery for a vehicle through a charging path including the PFC circuit part, the first switching part, the transformer, and body diodes of the first to fourth MOSFETs.

According to an exemplary embodiment, an inrush current (IR) may be prevented by initially charging a link capacitor, without employing a conventional pre-charge relay for charging the link capacitor, thereby simplifying a circuit without requiring an additional design for the control of the pre-charge relay.

DRAWINGS

Figure 2:
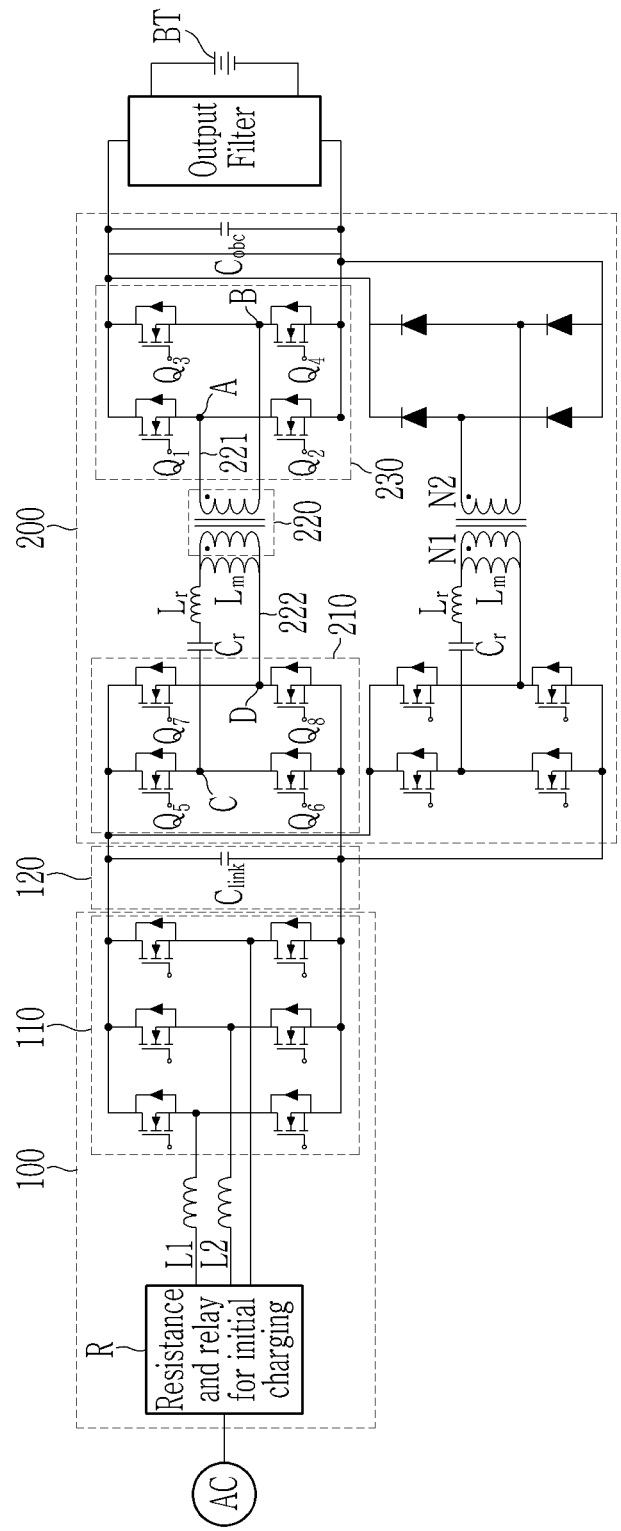
FIG. 2 is a circuit diagram of an apparatus for charging a battery for a vehicle in FIG. 1.

FIG. 4, FIG. 5, FIG. 6, FIG. 7A, FIG. 7B, FIG. 7C respectively illustrate first to fourth PWM signals applied to a second switching part of FIG. 2 and a transformer voltage according thereto.

Figure 8:
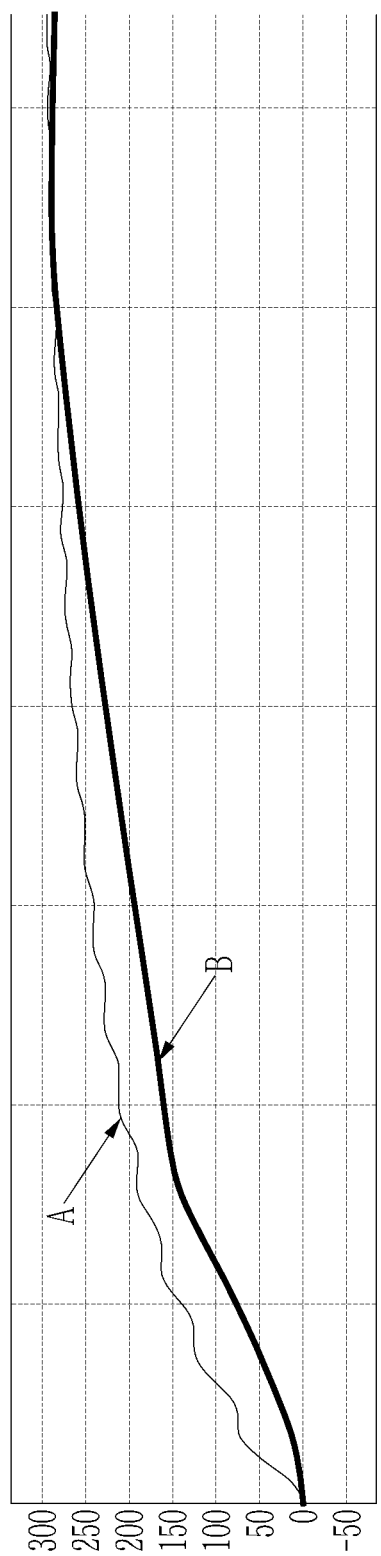

FIG. 8 illustrates a voltage change of a link capacitor that is initially charged by a discharging power of a battery for a vehicle according to an exemplary embodiment, in comparison to a conventional art.

Figure 9A:
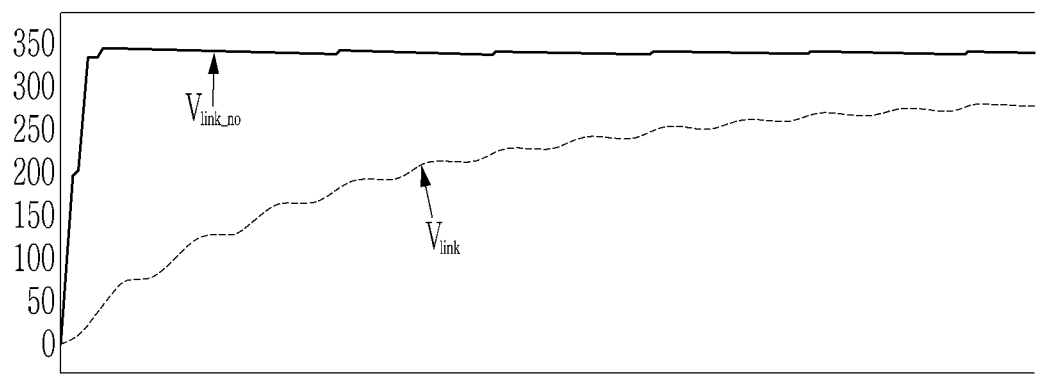
Figure 9B:
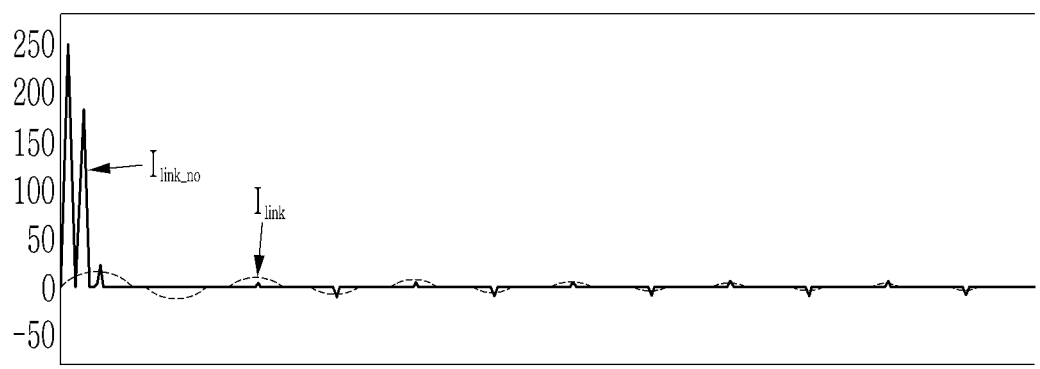

FIG. 9A and FIG. 9B are exemplary diagrams showing the change in voltage and current of the link capacitor with and without the initial charging of the link capacitor.

DETAILED DESCRIPTION

A battery for a vehicle is a power source of an electric vehicle (EV), and may be implemented as a rechargeable battery (e.g., generally a lithium-ion battery) that may be repeatedly charging and discharging electrical energy. Here, the electric vehicle may include any kind of vehicles, such as a hybrid electric vehicle (HEV), a plug-in hybrid electric vehicle (PHEV), and the like, that includes a battery that may store the electrical energy for driving the vehicle. The battery for a vehicle is configured, for example, by stacking cells in series therein, and may have an internal voltage in the range of about 240-413V depending on the state of charge.

In order to charge a battery for a vehicle, a fast charging scheme for charging the battery by directly applying a high voltage DC power may be efficient. However, currently, the infrastructure for the fast charging scheme has not been sufficiently built, and accordingly, a scheme of charging a vehicle using a commercial AC voltage for home is also used. For such a purpose, the electric vehicle may include an on-board charger (OBC) that rectifies AC voltage (or current) to DC voltage (or current), and boosts or reduces DC voltage (or current) to charge the battery for a vehicle.

Hereinafter, exemplary embodiments disclosed in the present specification will be described in detail with reference to the accompanying drawings. In the present specification, the same or similar components will be denoted by the same or similar reference numerals, and a repeated description thereof will be omitted. Terms "module" and/or "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present disclosure may obscure the gist of the present disclosure, it will be omitted. The accompanying drawings are provided only in order to allow exemplary embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprises" and "have" used in the present specification specify the presence of stated features, numerals, steps, operations, components, parts, or combinations thereof, but do not preclude the presence or addition of one or more other features, numerals, steps, operations, components, parts, or combinations thereof.

Figure 1:
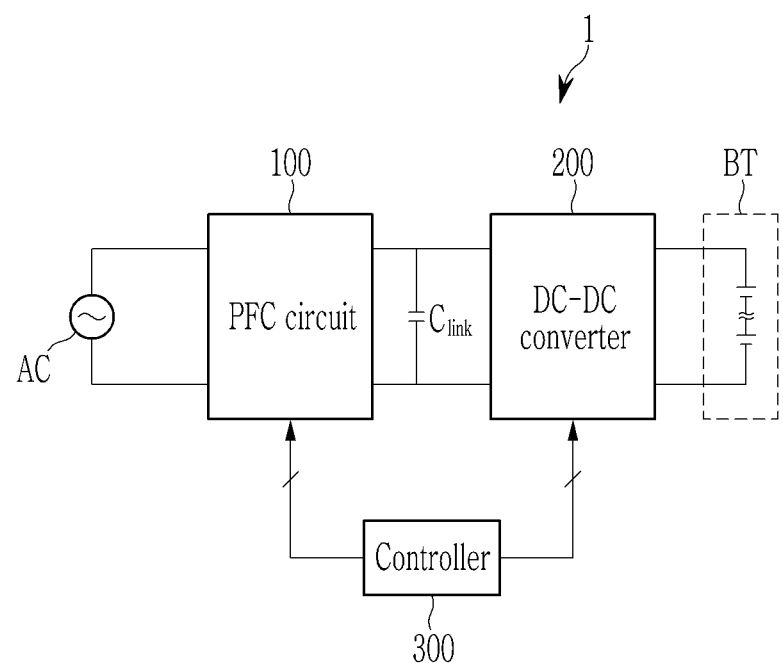
FIG. 1 is a block diagram showing an apparatus for charging a battery for a vehicle according to an exemplary embodiment.

FIG. 1 is a block diagram showing an apparatus for charging a battery for a vehicle according to an exemplary embodiment.

Referring to FIG. 1, an apparatus 1 for charging a battery for a vehicle includes a power factor correction (PFC) circuit part 100, a bidirectional DC-DC converter 200, and a controller 300. The apparatus 1 for charging a battery for a vehicle may include a bidirectional on-board charger (OBC) that charges a battery BT for a vehicle by an input power source, for example, a commercial AC power source AC, and supplies an electrical power discharged from the battery BT for a vehicle to an electrical load. FIG. 1 illustrates a link capacitor $C_{link}$ is employed as a separate element from the PFC circuit part 100, but is not limited thereto. The link capacitor $C_{link}$ may be included in the PFC circuit part 100.

The commercial AC power source AC is connected to an input terminal of the PFC circuit part 100, and the bidirectional DC-DC converter 200 is connected to an output terminal of the PFC circuit part 100. In a battery charging mode for slow charging the battery BT for a vehicle, the PFC circuit part 100 rectifies an AC power applied from the commercial AC power source AC to a DC power and transmits it to the bidirectional DC-DC converter 200.

The PFC circuit part 100 is a power factor correction circuit, and may play a role of reducing power loss in the process of converting AC power to DC power.

According to an exemplary embodiment, the PFC circuit part 100 may include the link capacitor $C_{link}$ that is connected in parallel between the output terminal and the bidirectional DC-DC converter 200. When the link capacitor $C_{link}$ is charged to a predetermined reference voltage $V_{ref}$ before entering the battery charging mode, an inrush current (IR) immediately after entering the battery charging mode may be prevented. The inrush current (IR) may cause degradation, performance deterioration, defects, and the like of other devices.

The commercial AC power source AC may be a single-phase AC power source that may be used for home or commercial use. The commercial voltage is generally single-phase AC 220V in Korea, and the voltage used may vary from country to country, but is within a range of 85 to 265 V. In addition, the frequency is generally 60 Hz, and may be 50 Hz. An AC power is generated by this commercial AC power source AC, and about 3-6 kW of power may be supplied to the battery BT for a vehicle. For example, the commercial AC power source AC may be electric vehicle supply equipment (EVSE).

The battery BT for a vehicle is a power source of an electric vehicle (EV), and may be implemented as a rechargeable battery, for example, lithium-ion battery capable of repeatedly charging and discharging electrical energy. The battery BT for a vehicle includes a plurality of cells connected in series or parallel, and may be a high voltage battery in the range of about 240-413V depending on the state of charge.

In the battery charging mode for charging for charging the battery BT for a vehicle with the commercial AC power source AC, the bidirectional DC-DC converter 200 boosts or reduces the voltage of DC power output from the PFC circuit part 100 to charge the battery BT for a vehicle. The bidirectional DC-DC converter 200 may charge the battery BT for a vehicle with an appropriate charging voltage of the battery BT for a vehicle, for example, a voltage in the range of about 240-413V.

In a battery discharge mode for supplying the electrical power discharged from the battery BT for a vehicle to a load, the bidirectional DC-DC converter 200 may boost or reduce the electrical power discharged from the battery BT for a vehicle and the boosted or reduced voltage to the PFC circuit part 100.

According to an exemplary embodiment, when a voltage of the link capacitor $C_{link}$ connected in parallel between the output terminal of the PFC circuit part 100 and an input terminal of the bidirectional DC-DC converter 200 is lower than the reference voltage $V_{ref}$ before entering the battery charging mode, the bidirectional DC-DC converter 200 may initially charge the link capacitor $C_{link}$ with the electrical power discharged from the battery BT for a vehicle, under the control of the controller 300.

Conventionally, an apparatus for charging a battery for a vehicle prevents the inrush current (IR) by initially charging the link capacitor $C_{link}$ with the electrical power applied from the electrical power applied from the commercial AC power source AC by using a pre-charge relay (not shown) disposed to the input terminal. However, a space for the pre-charge relay was required in the circuit, and there has been a problem such as durability deterioration due to continuous on/off operation. According to an apparatus 1 for charging a battery for a vehicle according to an exemplary embodiment, such a pre-charge relay may be excluded by initially charging the link capacitor $C_{link}$ by the bidirectional DC-DC converter 200.

According to an exemplary embodiment, when an apparatus 1 for charging a battery for a vehicle is connected to the commercial AC power source AC, e.g., the electric vehicle supply equipment (EVSE), the controller 300 determines, prior to charging the battery BT for a vehicle, determine whether the voltage of the link capacitor $C_{link}$ is below the reference voltage $V_{ref}$. When the voltage of the link capacitor $C_{link}$ is below the reference voltage $V_{ref}$, the controller 300 firstly controls the bidirectional DC-DC converter 200 such that the link capacitor $C_{link}$ is charged above the reference voltage $V_{ref}$. When the voltage of the link capacitor $C_{link}$ becomes above the reference voltage $V_{ref}$, the controller 300 charges the battery BT for a vehicle with the electrical power applied from the commercial AC power source AC.

FIG. 2 is a circuit diagram of an apparatus for charging a battery for a vehicle in FIG. 1.

Referring to FIG. 2, the PFC circuit part 100 may include a rectifier part 110 and a link capacitor part 120. The rectifier part 110 rectifies an AC power applied from the commercial AC power source AC to a DC power in the battery charging mode. The link capacitor part 120 includes the link capacitor $C_{link}$ that smooths the rectified DC power rectified at the rectifier part 110. The link capacitor par 120, in more detail, the link capacitor $C_{link}$, is connected in parallel to each other between the output terminal of the PFC circuit part 100 and the bidirectional DC-DC converter 200.

The bidirectional DC-DC converter 200 includes a first switching part 210, a transformer 220, and a second switching part 230.

The first switching part 210 converts a DC power applied from the PFC circuit part 100 to an AC power in the battery charging mode. The first switching part 210 controls, under the control of the controller 300, an electrical power transmission direction between the battery BT for a vehicle and the link capacitor $C_{link}$ and a current level of an output current of the battery BT for a vehicle.

The first switching part 210 includes a fifth MOSFET Q5, a sixth MOSFET Q6, a seventh MOSFET Q7, and an eighth MOSFET Q8. Each of the fifth to eighth MOSFETs Q5, Q6, Q7, and Q8 may include a body diode.

The fifth MOSFET Q5 and the sixth MOSFET Q6 are connected in series between a first terminal and a second terminal of the link capacitor $C_{link}$. The seventh MOSFET Q7 and the eighth MOSFET Q8 are connected in series between a first terminal of the fifth MOSFET Q5 and a second terminal of the sixth MOSFET Q6. At this time, a first terminal of a secondary coil 222 of the transformer 220 is connected to a third node C between the fifth MOSFET Q5 and the sixth MOSFET Q6, and a second terminal of the secondary coil 222 is connected to a fourth node D between the seventh MOSFET Q7 and the eighth MOSFET Q8.

The transformer 220 boosts or reduces a voltage in the battery charging mode and/or the battery discharge mode. The transformer 220 includes a primary coil 221 and the secondary coil 222.

For example, when the link capacitor $C_{link}$ is charged, the transformer 220 boosts or reduces the voltage of an AC power applied through the second switching part 230, and transmits the boosted or reduced voltage to the first switching part 210. In another example, when the battery BT for a vehicle is charged, the transformer 220 boosts or reduces the voltage of the AC power applied through the first switching part 210 and transmits the boosted or reduced voltage to the second switching part 230.

The second switching part 230 rectifies an AC power applied from the transformer 220 to a DC power to charge the battery BT for a vehicle the battery charging mode. The second switching part 230 controls, under the control of the controller 300, the electrical power transmission direction between the battery BT for a vehicle and the link capacitor $C_{link}$ and a current level of a charging current $I_{link}$ applied to the link capacitor $C_{link}$.

The second switching part 230 may include a first MOSFET Q1, a second MOSFET Q2, a third MOSFET Q3, and a fourth MOSFET Q4. Each of the first to fourth MOSFETs Q1, Q2, Q3, and Q4 may include a body diode.

Conventionally, a unidirectional DC-DC converter includes unidirectional diodes at positions corresponding to the first to fourth MOSFETs Q1, Q2, Q3, and Q4 and may only perform a function of charging the battery BT for a vehicle. However, the second switching part 230 according to an exemplary embodiment includes the first to fourth MOSFETs Q1, Q2, Q3, and Q4 that respectively include the body diode, and may function as a bidirectional DC-DC converter. That is, under the control of the second switching part 230, the battery BT for a vehicle may be charged, or the electrical power discharged from the battery BT for a vehicle may be supplied to the link capacitor $C_{link}$ or an electrical load.

The first MOSFET Q1 and the second MOSFET Q2 are connected in series between a first electrode (+) and a second electrode (−) of a battery for a vehicle. The third MOSFET Q3 and the fourth MOSFET Q4 are connected in series between a first terminal of the first MOSFET Q1 and a second terminal of the second MOSFET Q2. A first terminal of the primary coil 221 of the transformer 220 is connected to a first node A between the first MOSFET Q1 and the second MOSFET Q2, and a second terminal of the primary coil 221 is connected to a second node B between the third MOSFET Q3 and the fourth MOSFET Q4.

That is, a drain terminal of the first MOSFET Q1 is connected to the first electrode (+) of the battery BT for a vehicle, and a source terminal of the first MOSFET Q1 and a drain terminal of the second MOSFET Q2 are connected in series. The first terminal of the primary coil 221 is connected to the first node A of the source terminal of between the first MOSFET Q1 and the drain terminal of the second MOSFET Q2, and a source terminal of the second MOSFET Q2 is connected to the second electrode (−) of the battery for a vehicle. In addition, a drain terminal of the third MOSFET Q3 is connected to the first electrode (+) of the battery for a vehicle, and a source terminal of the third MOSFET Q3 and a drain terminal of the fourth MOSFET Q4 are connected in series. The second terminal of the primary coil 221 is connected to the second node B between the source terminal of the third MOSFET Q3 and the drain terminal of the fourth MOSFET Q4, and a source terminal of the fourth MOSFET Q4 is connected to the second electrode (−) of the battery for a vehicle.

In the battery charging mode, in the first switching part 210, when the fifth MOSFET Q5 and the eighth MOSFET Q8 are turned on, the sixth MOSFET Q6 and the seventh MOSFET Q7 are turned off, and when the fifth MOSFET Q5 and the eighth MOSFET Q8 are turned off, the sixth MOSFET Q6 and the seventh MOSFET Q7 are turned on. Thereby, the DC power applied from the PFC circuit part 100 is converted to the AC power. At this time, the first to fourth MOSFETs Q1, Q2, Q3, and Q4 included in the second switching part 230 are turned-off. The AC power converted at the first switching part 210 charges an output terminal capacitor $C_{obc}$ through a charging path including the transformer 220 and the body diodes of the first to fourth MOSFETs Q1, Q2, Q3, and Q4. Thereafter, the electric power charged at the output terminal capacitor $C_{obc}$ is discharged to charge the battery BT for a vehicle.

In the battery discharge mode, in the second switching part 230, when the first MOSFET Q1 and the fourth MOSFET Q4 are turned on, the second MOSFET Q2 and the third MOSFET Q3 are turned off, and when the first MOSFET Q1 and the fourth MOSFET Q4 are turned off, the second MOSFET Q2 and the third MOSFET Q3 are turned on. Thereby, the DC power discharged from the battery BT for a vehicle is converted to an AC power. At this time, the fifth to eighth MOSFETs Q5, Q6, Q7, and Q8 in the first switching part 210 are turned off. The AC power converted at the second switching part 230 is applied to the link capacitor $C_{link}$ through a discharge path including the transformer 220 and the body diodes of the fifth to eighth MOSFETs Q5, Q6, Q7, and Q8. Thereafter, the electric power charged at the link capacitor $C_{link}$ may be discharged to be applied to the commercial AC power source AC through the PFC circuit part 100.

According to an exemplary embodiment, prior to entering the battery charging mode, when a voltage $V_{link}$ of the link capacitor $C_{link}$ is below the reference voltage $V_{ref}$, an apparatus 1 for charging the battery for a vehicle may charge the voltage $V_{link}$ of the link capacitor $C_{link}$ to be higher than the reference voltage $V_{ref}$ by the electrical power discharged from the battery BT for a vehicle. That is, an apparatus 1 for charging the battery for a vehicle may charge the battery BT for a vehicle with the electrical power applied from the commercial AC power source AC, after the voltage $V_{link}$ of the link capacitor $C_{link}$ is charged above the reference voltage $V_{ref}$.

According to an exemplary embodiment, the first switching part 210 and the second switching part 230 may form a full-bridge converter and may be controlled in a phase shift control scheme. For example, in the battery charging mode, the first switching part 210 may control the phase of the seventh MOSFET Q7 and the eighth MOSFET Q8, and thereby may adjust a period for which the fifth MOSFET Q5 and the eighth MOSFET Q8 are simultaneously turned on to allow a current to flow and a period for which the sixth MOSFET Q6 and the seventh MOSFET Q7 are simultaneously turned on to allow a current to flow. At this time, a charging current level transmitted to the transformer 220 may increase as the period of simultaneously turning-on increases. In another example, in the battery discharge mode or while charging the link capacitor $C_{link}$, the second switching part 230 may control the phase of the third MOSFET Q3 and the fourth MOSFET Q4, and thereby may adjust a period for which the first MOSFET Q1 and the fourth MOSFET Q4 are simultaneously turned on to allow a current to flow and a period for which the second MOSFET Q2 and the third MOSFET Q3 are simultaneously turned on to allow a current to flow. At this time, a discharge current level transmitted to the transformer 220 may increase as the period of simultaneous turning-on increases.

Figure 3:
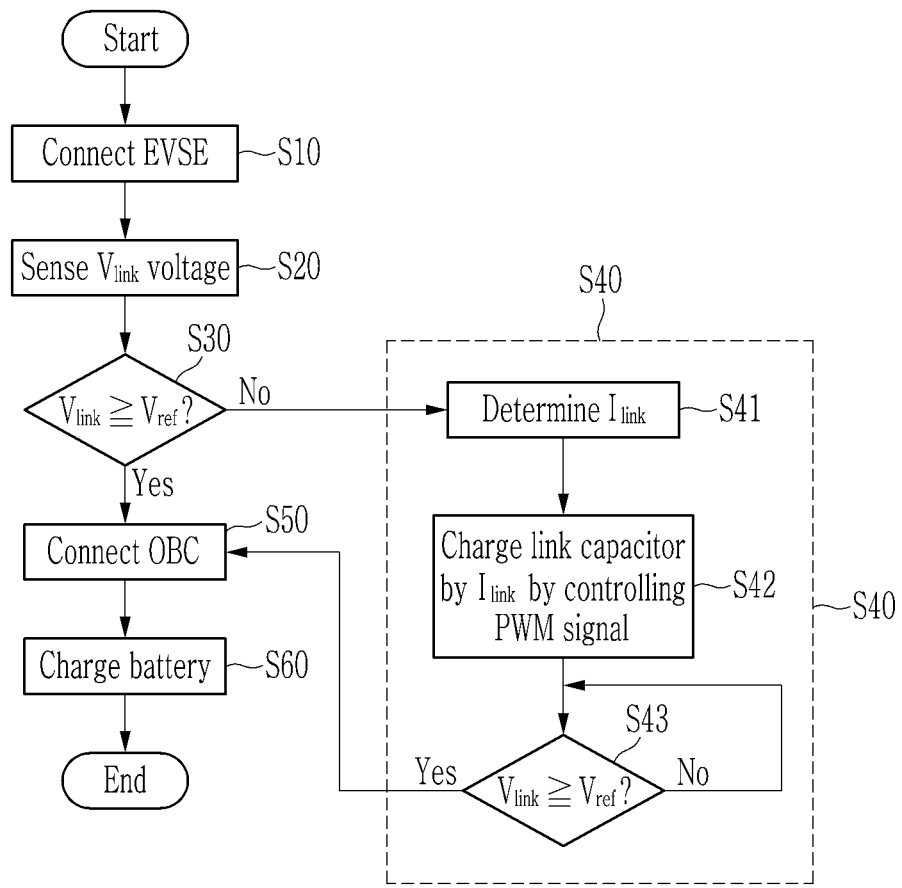
FIG. 3 is a flowchart showing a method for charging a battery for a vehicle according to an exemplary embodiment.

FIG. 3 is a flowchart showing a method for charging the battery for a vehicle according to an exemplary embodiment. FIG. 4 to FIG. 7 respectively illustrate first to fourth PWM signals applied to a second switching part of FIG. 2 and a transformer voltage according thereto. FIG. 8 illustrates a voltage change of a link capacitor that is initially charged by a discharging power of the battery for a vehicle according to an exemplary embodiment, in comparison to a conventional art.

Hereinafter, an apparatus for charging the battery for a vehicle and a method for charging the battery for a vehicle according to an exemplary embodiment are described in detail with reference to FIG. 2 to FIG. 8.

Firstly, a vehicle is connected to the electric vehicle supply equipment (EVSE) at step S10. At this time, at step S20, the controller 300 senses the voltage $V_{link}$ of the link capacitor $C_{link}$ that is connected in parallel between the output terminal of the PFC circuit part 100 and the input terminal of the bidirectional DC-DC converter 200, synchronously with a time point entering the battery charging mode for charging the battery BT for a vehicle.

That is, upon receiving a connection signal from a sensor (not shown) that senses a connection to the commercial AC power source AC, for example, the electric vehicle supply equipment (EVSE), the controller 300 may check a charged state of the link capacitor $C_{link}$.

Subsequently at step S30, the controller 300 determines whether the voltage $V_{link}$ of the link capacitor $C_{link}$ is above or equal to the reference voltage $V_{ref}$.

That is, when the electric vehicle supply equipment (EVSE) and an apparatus 1 for charging the battery for a vehicle are physically connected to each other, the controller 300 determines whether the voltage $V_{link}$ of the link capacitor $C_{link}$ is above or equal to the reference voltage $V_{ref}$ prior to charging the battery BT for a vehicle.

Subsequently at step S40, when the voltage $V_{link}$ of the link capacitor $C_{link}$ is below the reference voltage $V_{ref}$ (S30-No), the controller 300 initially charges the link capacitor $C_{link}$ by the electrical power discharged from the battery BT for a vehicle.

When an apparatus 1 for charging the battery for a vehicle is electrically connected to the commercial AC power source AC to receive an electrical power while the voltage $V_{link}$ of the link capacitor $C_{link}$ is below the reference voltage $V_{ref}$, damage to other elements may be caused due to a rapid increase in the voltage $V_{link}$ of the link capacitor $C_{link}$ and the charging current $I_{link}$.

According to an exemplary embodiment, under the control of the controller 300, the DC power discharged from the battery BT for a vehicle is converted to an AC power through the second switching part 230 of the bidirectional DC-DC converter 200, and the converted AC power is applied to the link capacitor $C_{link}$ through the transformer 220 and the body diodes of the first switching part 210. Thereafter, when an apparatus 1 for charging the battery for a vehicle and the electric vehicle supply equipment (EVSE) are electrically connected after the voltage $V_{link}$ of the link capacitor $C_{link}$ is charged above the reference voltage $V_{ref}$, the inrush current (IR) may be prevented, thereby reducing the possibility of damage to other elements.

During the step S40, firstly at step S41, the controller 300 calculates a level of the charging current $I_{link}$ to be applied to the link capacitor $C_{link}$ and an increment ΔI of the charging current $I_{link}$ per unit time, in order to charge the voltage $V_{link}$ of the link capacitor $C_{link}$ above the reference voltage $V_{ref}$.

For example, the controller 300 may calculate 3 A for the charging current $I_{link}$ to be applied to the link capacitor $C_{link}$ in order for the link capacitor $C_{link}$ to be charged to the voltage $V_{link}$ corresponding to the reference voltage $V_{ref}$, and may calculate 0.1 A for the increment ΔI of the charging current $I_{link}$ per unit time. That is, the controller 300 control the charging current $I_{link}$ to sequentially increase from 0 A to 3 A, i.e., to increase in a sequence of 0.1 A, 0.2 A, 0.3 A, . . . , 2.9 A, 3 A.

Subsequently at step S42, the controller 300 controls first to eighth PWM signals applied to the bidirectional DC-DC converter 200, thereby charging the link capacitor $C_{link}$ by the calculated charging current $I_{link}$.

In the battery discharge mode, in the second switching part 230, when the first MOSFET Q1 and the fourth MOSFET Q4 are turned on, the second MOSFET Q2 and the third MOSFET Q3 are turned off, and when the first MOSFET Q1 and the fourth MOSFET Q4 are turned off, the second MOSFET Q2 and the third MOSFET Q3 are turned on. Thereby, the DC power discharged from the battery BT for a vehicle is converted to an AC power. At this time, the fifth to eighth MOSFETs Q5, Q6, Q7, and Q8 in the first switching part 210 are turned-off. The AC power converted at the second switching part 230 may be applied to the link capacitor $C_{link}$ through a discharge path including the transformer 220 and fifth to eighth body diodes. The fifth to eighth body diodes may be respectively connected in parallel to the fifth to eighth MOSFETs Q5, Q6, Q7, and Q8.

For example, the controller 300 may initially set the first to fourth PWM signals such that the electrical power is applied through the charging path, supposing that the battery charging mode is entered in the premises that the voltage $V_{link}$ of the link capacitor $C_{link}$ is above or equal to the reference voltage $V_{ref}$.

Figure 4:
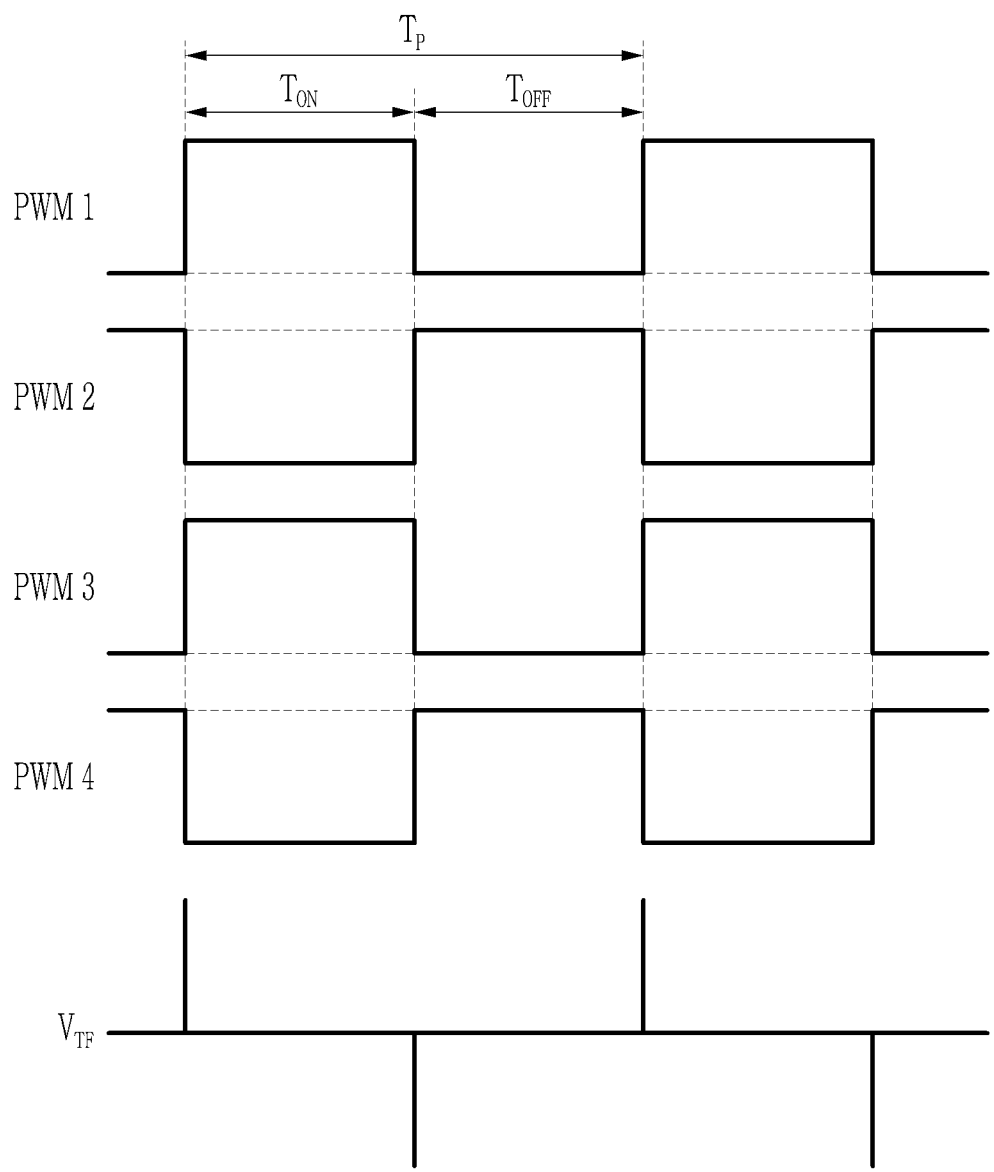

Referring to FIG. 4, the controller 300 may set the first to fourth PWM signals, such that a first PWM signal and a third PWM signal have a same duty ratio of 50% and a same phase, and a second PWM signal and a fourth PWM signal have the same duty ratio of 50% and a phase difference of 180 degree compared to the first PWM signal and the third PWM signal, such that the electric power of the battery BT for a vehicle is not applied to the transformer 220 through a discharge path that is a reverse direction of the charging path. That is, the voltage $V_{TF}$ of the AC power applied toward the transformer 220 from the second switching part 230 may be 0 V.

In more detail, in the case that the first to the fourth PWM signals shown in FIG. 4 are respectively applied to the first to fourth MOSFETs Q1, Q2, Q3, and Q4, when the first MOSFET Q1 and the third MOSFET Q3 are turned on, the second MOSFET Q2 and the fourth MOSFET Q4 are turned off, and when the first MOSFET Q1 and the third MOSFET Q3 are turned off, the second MOSFET Q2 and the fourth MOSFET Q4 are turned on. Thereby, the electric power is not supplied through a discharge path including the first to fourth MOSFETs Q1, Q2, Q3, and Q4.

Figure 5:
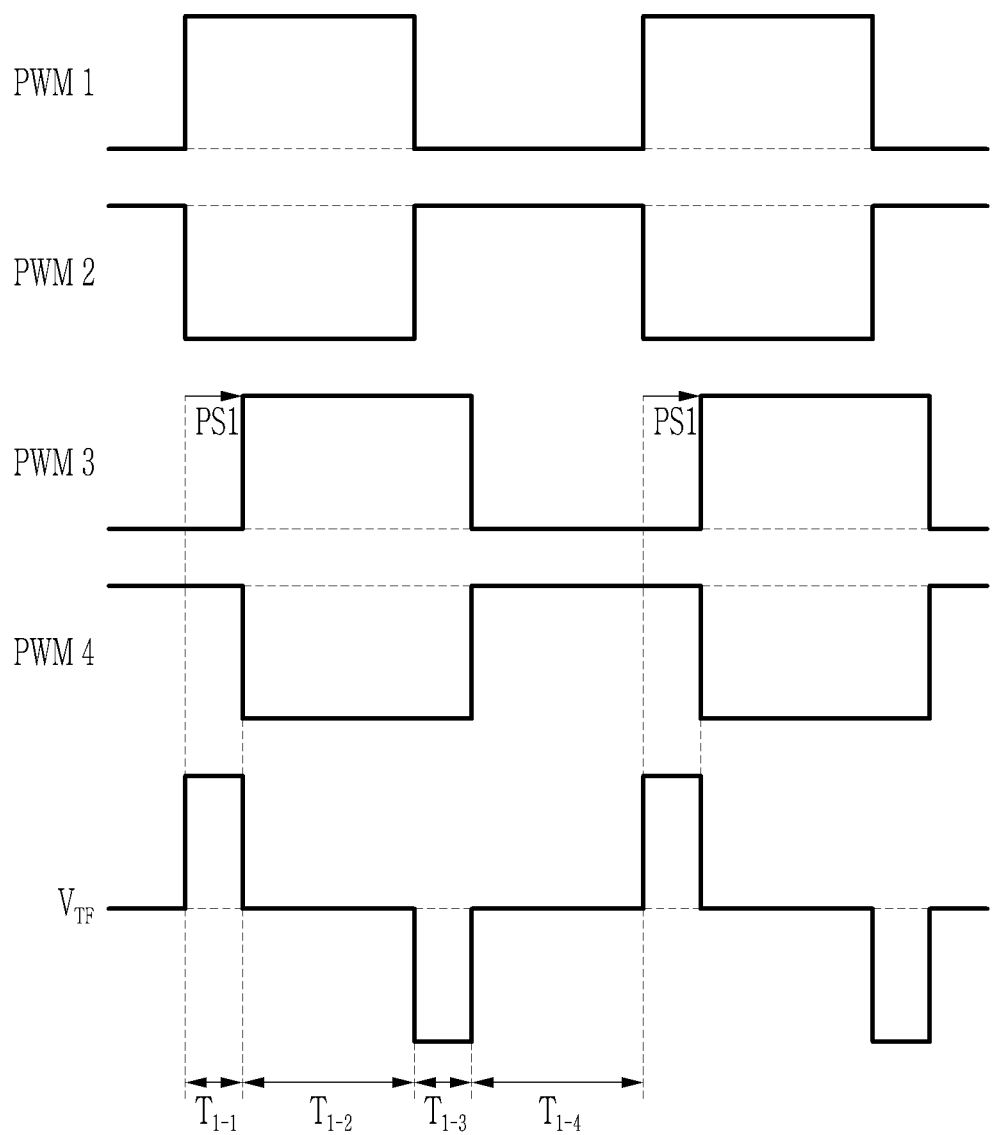
Figure 6:
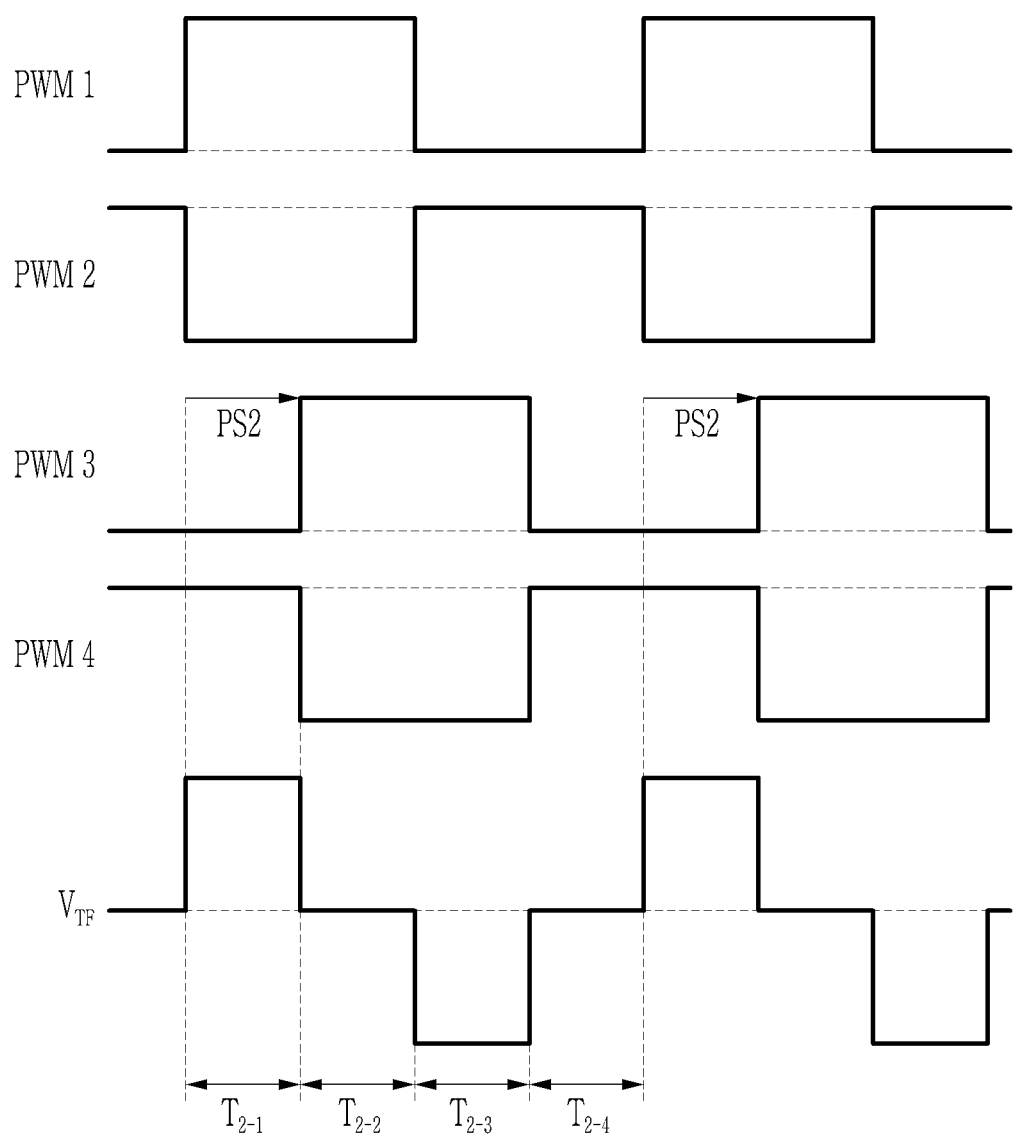

According to an exemplary embodiment, when charging of the link capacitor $C_{link}$ is required, the controller 300 may control the level of the voltage $V_{TF}$ of the AC power applied toward the transformer 220 from the second switching part 230, by controlling the phase shift of the third PWM signal and the fourth PWM signal. Referring to FIG. 2, FIG. 5, and FIG. 6, in response to the phase shift of the third PWM signal and the fourth PWM signal, the electric power of the battery BT for a vehicle is applied the transformer 220 through the second switching part 230.

In more detail, referring to FIG. 5, during a first period T1_1 where the phases of the third PWM signal and the fourth PWM signal are shifted by PS1, the first PWM signal and the fourth PWM signal in an On-level are applied to the first MOSFET Q1 and the fourth MOSFET Q4, thereby turning on the first MOSFET Q1 and the fourth MOSFET Q4, and the second PWM signal and the third PWM signal in an Off-level are applied to the second MOSFET Q2 and the third MOSFET Q3, thereby turning off the second MOSFET Q2 and the third MOSFET Q3. Thereby, the electric power $V_{TF}$ (+) of the battery BT for a vehicle is applied the transformer 220 through the second switching part 230.

In addition, during a third period T1_3 where the phases of the third PWM signal and the fourth PWM signal are shifted by PS1, the first PWM signal and the fourth PWM signal in the Off-level are applied to the first MOSFET Q1 and the fourth MOSFET Q4, thereby turning off the first MOSFET Q1 and the fourth MOSFET Q4, and the second PWM signal and the third PWM signal in the On-level are applied to the second MOSFET Q2 and the third MOSFET Q3, thereby turning on the second MOSFET Q2 and the third MOSFET Q3. Thereby, the electric power $V_{TF}$ (−) of the battery BT for a vehicle is applied the transformer 220 through the second switching part 230.

Referring to FIG. 6, when the phase shift of the third PWM signal and the fourth PWM signal becomes larger (PS1<PS2), the electric power of the battery BT for a vehicle is applied the transformer 220 through the second switching part 230, during a period corresponding to the enlarged phase shift.

Figure 7A:
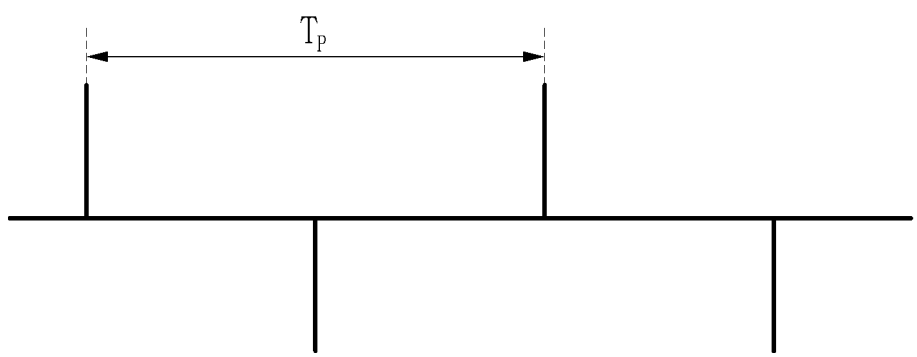
Figure 7B:
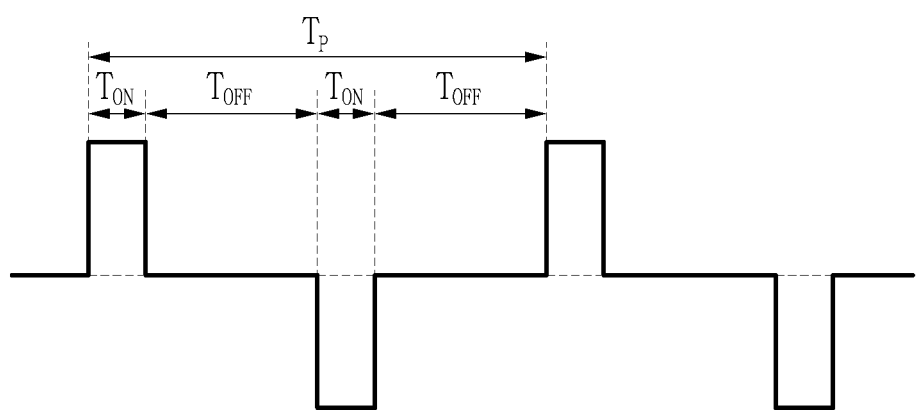
Figure 7C:
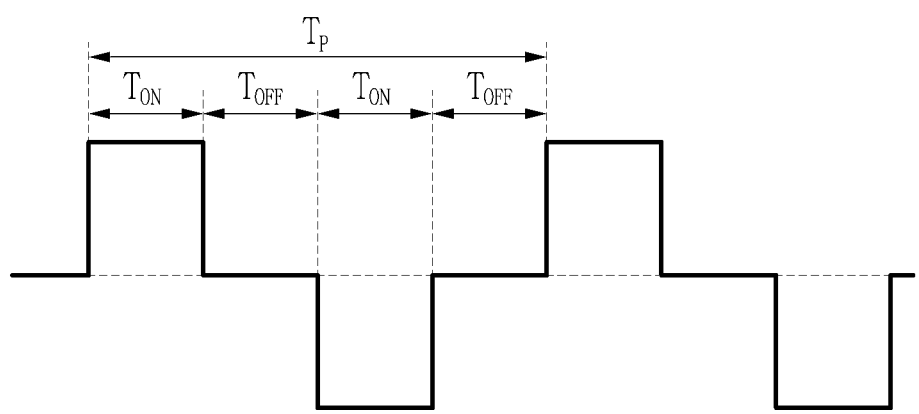

Referring to FIG. 7A, 7B, 7C the controller 300 may control the phase shift of the third PWM signal and the fourth PWM signal to have a same effect of controlling a duty ratio of a PWM signal for controlling the level of the electrical power applied to the transformer 220. Therefore, as the phase shift of the third PWM signal and the fourth PWM signal is larger, an average value of the electrical power applied to the transformer 220 may become higher, and accordingly, the level of the charging current $I_{link}$ may increase. Graphs in FIG. 7A, 7B, 7C corresponds to the drawings of FIG. 4 to FIG. 6 showing the level of the electric power $V_{TF}$ of the transformer 220.

For example, while the link capacitor $C_{link}$ is charged, the bidirectional DC-DC converter 200 may form a phase shift full bridge (PSFB) converter. The first to fourth MOSFETs Q1, Q2, Q3, and Q4 of the second switching part 230 may form a primary-side full bridge circuit, the fifth to eighth MOSFETs Q5, Q6, Q7, and Q8 of the first switching part 210 are all turned-off, and the fifth to eighth body diodes may form a secondary-side full-wave rectifier circuit.

In connection with the PSFB converter, the controller 300 may control the phase of the third PWM signal and the fourth PWM signal, and thereby may control a period for which the first PWM signal and the fourth PWM signal are simultaneously turned on or a period for which the third PWM signal and the fourth PWM signal are simultaneously turned on. The level of the charging current $I_{link}$ applied to the link capacitor $C_{link}$ may increase as a period for which the first PWM signal and the fourth PWM signal are simultaneously turned on increase.

Subsequently at step S43, the controller 300 determines whether the voltage $V_{link}$ of the link capacitor $C_{link}$ is above or equal to the reference voltage $V_{ref}$.

Subsequently, when the voltage $V_{link}$ of the link capacitor $C_{link}$ is above or equal to the reference voltage $V_{ref}$ (S30—Yes; or S43—Yes), the controller 300 electrically connects, at step S5, the electric vehicle supply equipment (EVSE) and an apparatus 1 for charging the battery for a vehicle, and then at step S60, may enter the battery charging mode for charging the battery BT for a vehicle.

In the battery charging mode, in the first switching part 210, when the fifth MOSFET Q5 and the eighth MOSFET Q8 are turned on, the sixth MOSFET Q6 and the seventh MOSFET Q7 are turned off, and when the fifth MOSFET Q5 and the eighth MOSFET Q8 are turned off, the sixth MOSFET Q6 and the seventh MOSFET Q7 are turned on. Thereby, the DC power applied from the PFC circuit part 100 is converted to the AC power. At this time, the first to fourth MOSFETs Q1, Q2, Q3, and Q4 in the second switching part 230 are turned off. The AC power converted at the first switching part 210 charges the output terminal capacitor $C_{obc}$ through a charging path including the transformer 220 and first to fourth body diodes. Thereafter, the electric power charged at the output terminal capacitor $C_{obc}$ may be discharged to charge the battery BT for a vehicle.

Referring to FIG. 8, the voltage change B obtained after initially charging the link capacitor $C_{link}$ through the bidirectional DC-DC converter 200 by a discharging power of the battery for a vehicle according to an exemplary embodiment is found to be similar to the voltage change A that is obtained after charging the link capacitor $C_{link}$ utilizing a conventional relay.

FIG. 9A illustrates the voltage change of the link capacitor with and without the initial charging of the link capacitor, and FIG. 9B illustrates the current change of the link capacitor with and without the initial charging of the link capacitor.

Referring to FIG. 9A and FIG. 9B, as shown in broken lines, if the on-board charger (OBC) is connected to the external power source after initially charging the link capacitor, the voltage $V_{link}$ of the link capacitor gently increases, and the current $I_{link}$ also has little variability. On the other hand, as shown in solid lines, if the on-board charger (OBC) is connected to the external power source while the link capacitor is not initially charged, the possibility of other elements being damaged may occur due to the rapid increase of the voltage $V_{link\_no}$ no and current $I_{link\_no}$ of the link capacitor.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An apparatus for charging a battery for a vehicle, the apparatus comprising:
    a power factor correction (PFC) circuit comprising:
    a rectifier configured to rectify an AC power applied from a commercial AC power source to a DC power in a battery charging mode for charging the battery for the vehicle; and
    a link capacitor connected in parallel to the rectifier and configured to smooth the rectified DC power;
    a bidirectional DC-DC converter comprising:
    a first switch configured to convert a DC power applied from the PFC circuit to an AC power;
    a transformer configured to boost or reduce a voltage of the AC power converted at the first switch; and
    a second switch configured to rectify an AC power applied from the transformer to a DC power to charge the battery for the vehicle; and
    a controller configured to control a phase of a pulse width modulation (PWM) signal applied to the second switch such that the link capacitor is charged by an electrical power discharged from the battery for the vehicle, when a voltage of the link capacitor is below a predetermined reference voltage prior to entering the battery charging mode.

2. The apparatus of claim 1, wherein the second switch comprises:
    a first MOSFET;
    a second MOSFET, wherein the first MOSFET and the second MOSFET are connected in series between a first electrode and a second electrode of the battery for the vehicle;
    a third MOSFET; and
    a fourth MOSFET, wherein the third MOSFET and the fourth MOSFET are connected in series between a first terminal of the first MOSFET and a second terminal of the second MOSFET,
    wherein a first terminal of a primary coil of the transformer is connected to a first node between the first MOSFET and the second MOSFET, and
    wherein a second terminal of the primary coil is connected to a second node between the third MOSFET and the fourth MOSFET.

3. The apparatus of claim 2, wherein the controller is configured to:
    calculate a level of a charging current to be applied to the link capacitor to charge the link capacitor above or equal to the predetermined reference voltage; and
    shift phases of a third PWM signal and a fourth PWM signal for controlling switching of the third MOSFET and the fourth MOSFET such that a voltage corresponding to the calculated level of the charging current is applied to the transformer.

4. The apparatus of claim 3, wherein the controller is further configured to:
    calculate an increment of the charging current per unit time; and
    shift phases of the third PWM signal and the fourth PWM signal such that a voltage corresponding to the calculated increment of the charging current per unit time is applied to the transformer.

5. The apparatus of claim 4, wherein:
    when the voltage of the link capacitor is charged above the predetermined reference voltage, the controller is configured to control the first PWM signal, the second PWM signal, the third PWM signal, and the fourth PWM signal such that:
    when the first MOSFET and the third MOSFET are turned on, the second MOSFET and the fourth MOSFET are turn off; and
    when the first MOSFET and the third MOSFET are turned off, the second MOSFET and the fourth MOSFET are turned on; and
    an electric power applied from the commercial AC power source is applied to the battery for the vehicle through a charging path including the PFC circuit, the first switch, the transformer, and body diodes of the first MOSFET, the second MOSFET, the third MOSFET, and the fourth MOSFET.

6. A method for charging a battery for a vehicle by a bidirectional DC-DC converter, the method comprising:
    sensing a voltage of a link capacitor connected in parallel to an output terminal of a power factor correction (PFC) circuit synchronously to a time point of entering a charging mode for charging a battery for a vehicle;
    determining whether the sensed voltage of the link capacitor is below a predetermined reference voltage;
    charging the link capacitor by an electrical power discharged from the battery for the vehicle by controlling a phase of a pulse width modulation (PWM) signal applied to a second switching, when the sensed voltage of the link capacitor is below the predetermined reference voltage; and
    charging the battery for the vehicle by an electrical power applied from a commercial AC power source when the voltage of the link capacitor is charged above the predetermined reference voltage,
    wherein the bidirectional DC-DC converter comprises:
    a first switch connected to the output terminal of the PFC circuit that is configured to rectify an AC power of the commercial AC power source to a DC power and to convert the DC power to an AC power;
    a transformer configured to boost or reduce a voltage of the AC power converted at the first switch; and
    a second switch configured to rectify an AC power applied from the transformer to a DC power to charge the battery for the vehicle.

7. The method of claim 6, wherein the second switch further comprises:
    a first MOSFET;
    a second MOSFET, wherein the first MOSFET and the second MOSFET are connected in series between a first electrode and a second electrode of the battery for the vehicle;
    a third MOSFET; and
    a fourth MOSFET, wherein the third MOSFET and the fourth MOSFET are connected in series between a first terminal of the first MOSFET and a second terminal of the second MOSFET,
    wherein a first terminal of a primary coil of the transformer is connected to a first node between the first MOSFET and the second MOSFET, and a second terminal of the primary coil is connected to a second node between the third MOSFET and the fourth MOSFET.

8. The method of claim 7, wherein the charging of the link capacitor comprises:
   calculating a level of a charging current to be applied to the link capacitor to charge the link capacitor above or equal to the predetermined reference voltage; and
   shifting phases of a third PWM signal and a fourth PWM signal for controlling switching of the third MOSFET and the fourth MOSFET such that a voltage corresponding to the calculated level of the charging current is applied to the transformer to charge the link capacitor.

9. The method of claim 8, wherein the method further comprises:
   calculating the level of the charging current based on an increment of the charging current per unit time; and
   shifting phases of the third PWM signal and the fourth PWM signal such that a voltage corresponding to the calculated increment of the charging current per unit time is applied to the transformer to charge the link capacitor.

10. The method of claim 9, wherein the shifting the phases of the third PWM signal and the fourth PWM signal comprises:
    when the voltage of the link capacitor is charged above the predetermined reference voltage, controlling the first PWM signal, the second PWM signal, the third PWM signal, and the fourth PWM signal such that:
    when the first MOSFET and the third MOSFET are turned on, the second MOSFET and the fourth MOSFET are turn off; and
    when the first MOSFET and the third MOSFET are turned off, the second MOSFET and the fourth MOSFET are turned on; and
    applying the electrical power applied from the commercial AC power source to the battery for the vehicle through a charging path including the PFC circuit, the first switch, the transformer, and body diodes of the first MOSFET, the second MOSFET, the third MOSFET, and the fourth MOSFET.

\* \* \* \* \*